United States Patent
Cho (10) Patent No.: US 11,498,559 B2
(45) Date of Patent: Nov. 15, 2022

(54) LAUNCH CONTROL METHOD FOR VEHICLE

(71) Applicants: Hyundai Motor Company, Seoul (KR); Kia Corporation, Seoul (KR)

(72) Inventor: Sung Hyun Cho, Yongin-si (KR)

(73) Assignees: HYUNDAI MOTOR COMPANY, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/458,963

(22) Filed: Aug. 27, 2021

(65) Prior Publication Data

US 2022/0266833 A1    Aug. 25, 2022

(30) Foreign Application Priority Data

Feb. 23, 2021    (KR) .................. 10-2021-0024049

(51) Int. Cl.
*B60W 30/18*    (2012.01)
*B60W 10/18*    (2012.01)
(Continued)

(52) U.S. Cl.
CPC ...... *B60W 30/18027* (2013.01); *B60W 10/02* (2013.01); *B60W 10/18* (2013.01);
(Continued)

(58) Field of Classification Search
CPC .............. B60W 10/02; B60W 10/18; B60W 30/18027; B60W 2510/0241; B60W 2510/0652; B60W 2520/26; B60W 2540/10; B60W 2540/12; B60W 2710/027; B60W 2710/182; B60W 2720/26; F16D 48/08; F16D 2500/10412; F16D 2500/30406; F16D 2500/30421;
(Continued)

(56) References Cited

U.S. PATENT DOCUMENTS 8,620,546 B2 * 12/2013 Kobayashi ......... B60K 23/0808
701/68
9,352,737 B2 * 5/2016 Pietron ........... B60W 30/18172
(Continued)

FOREIGN PATENT DOCUMENTS

KR    10-2021-0003349 A    1/2021

*Primary Examiner* — Edwin A Young
(74) *Attorney, Agent, or Firm* — Morgan, Lewis & Bockius LLP (57) ABSTRACT

A launch control method for a vehicle may include a step of increasing clutch torque of a clutch according to a decrease in braking pressure, a step of maintaining a current level of the clutch torque for a first reference duration, a step of gradually reducing the clutch torque within a range which is lower than the first reference torque level and is equal to or greater than a second reference torque level which is lower than the first reference torque level, a step of gradually increasing the clutch torque until the clutch torque reaches a third reference torque level which is higher than the first reference torque level, and a step of bringing the control to a stop when a state in which a clutch slip is less than a predetermined critical synchronous slip is maintained for a predetermined critical synchronization duration or longer than the predetermined critical synchronization duration.

20 Claims, 4 Drawing Sheets

(51) Int. Cl.
B60W 10/02 (2006.01)
F16D 48/08 (2006.01)

(52) U.S. Cl.
CPC ............... *B60W 2510/0241* (2013.01); *B60W 2510/0652* (2013.01); *B60W 2520/26* (2013.01); *B60W 2540/10* (2013.01); *B60W 2540/12* (2013.01); *B60W 2710/027* (2013.01); *B60W 2710/182* (2013.01); *B60W 2720/26* (2013.01); *F16D 48/08* (2013.01); *F16D 2500/10412* (2013.01); *F16D 2500/30406* (2013.01); *F16D 2500/30421* (2013.01); *F16D 2500/3115* (2013.01); *F16D 2500/3118* (2013.01); *F16D 2500/3144* (2013.01); *F16D 2500/31426* (2013.01)

(58) Field of Classification Search
CPC ..... F16D 2500/3115; F16D 2500/3118; F16D 2500/31426; F16D 2500/3144
See application file for complete search history.

(56) References Cited

U.S. PATENT DOCUMENTS

2015/0344018 A1* 12/2015 Shimoyama ............ B60L 50/16
    180/65.265
2019/0202461 A1* 7/2019 Kim ...................... B60W 10/06

* cited by examiner

LAUNCH CONTROL METHOD FOR VEHICLE

CROSS REFERENCE TO RELATED APPLICATION

The present application claims priority to Korean Patent Application No. 10-2021-0024049, filed Feb. 23, 2021, the entire contents of which is incorporated herein for all purposes by this reference.

BACKGROUND OF THE INVENTION

Field of the Invention

The present invention relates to a launch control method for a vehicle, the method being capable of precisely controlling torque transmission from an engine to driving wheels through control of clutch torque as in a dual clutch transmission (DCT) system or an automated manual transmission (AMT) system.

Description of Related Art

Launch control of a vehicle is a vehicle control technique that accelerates the vehicle from a standing start as fast as possible, and it is mostly found in racing or high-performance vehicles.

In vehicles provided with an automatic transmission (AT) having a torque converter, the torque transmitted to the driving wheels is determined by the torque converter. For the present reason, AT-based vehicles launch control cannot be easily used due to difficulty in precisely controlling the torque transmitted to the driving wheels.

However, in DCT- or AMT-based vehicles, which are provided with a transmission that can precisely control the torque transmitted to the driving wheels from the engine by controlling a clutch torque, it is relatively easy to use the launch control because the transmitted torque may be precisely controlled through the control of the clutch torque.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle launch control method that enables an extremely fast acceleration of an AMT- or DCT-based vehicle provided with a transmission that can precisely control a torque transmission from an engine to driving wheels, thereby enhancing customer satisfaction for the vehicle.

To accomplish the objective, various aspects of the present invention are directed to providing a vehicle launch control method including the steps of: [A] when a launch control operation is initiated, adaptively increasing clutch torque of a clutch according to a decrease in braking pressure; [B] when the clutch torque increases to reach or exceed a first reference torque level, maintaining a current level of the clutch torque for a first reference duration; [C] after a lapse of the first reference duration, when a wheel slip ratio exceeds a first reference slip ratio, gradually reducing the clutch torque within a range which is lower than the current level and is equal to or greater than a second reference torque level which is lower than the first reference torque level; [D] when the wheel slip ratio is equal to or less than a second reference slip ratio which is less than the first reference slip ratio or when a second reference duration has elapsed after the clutch torque reaches or exceeds the first reference torque level, gradually increasing the clutch torque until the clutch torque reaches a third reference torque level which is higher than the first reference torque level; and [E] stopping the launch control operation when a period during which a clutch slip remains less than a predetermined critical synchronous slip is equal to or longer than a predetermined critical duration, in which the launch control operation is initiated when a driver selects a launch control option, both an accelerator pedal and a brake pedal are depressed, and an engine speed reaches a predetermined reference engine speed.

The clutch torque may be maintained at a preparation torque level until the engine speed reaches the reference engine speed.

In step [A], the clutch torque may be gradually reduced when the braking pressure is equal to or greater than a second reference braking pressure, and the clutch torque may be linearly increased at a rate corresponding to a first gradient when the braking pressure is lower than the second reference braking pressure.

The clutch torque may be linearly increased at a rate corresponding to a second gradient until the clutch torque reaches the first reference torque level when the accelerator pedal remains depressed down to a position that corresponds to a second APS reference value or more and the braking pressure becomes equal to or lower than a third reference braking pressure which is lower than the second reference braking pressure.

In step [C], the clutch torque may be reduced while a feedback control operation to reduce the wheel slip ratio is performed.

In step [C], the clutch torque may not be reduced but be maintained as it is when the wheel slip ratio is equal to or less than the first reference slip ratio.

In step [D], the clutch torque may be increased while a feedback control operation to reduce the wheel slip ratio is performed.

To accomplish the objective, various aspects of the present invention are directed to providing a vehicle launch control method including the steps of: [A] when a launch control operation is initiated, adaptively increasing clutch torque of a clutch according to a decrease in braking pressure; [B] when the clutch torque increases to reach or exceed a first reference torque level, maintaining a current level of the clutch torque for a first reference duration; [C] after a lapse of the first reference duration, when a wheel slip ratio exceeds a first reference slip ratio, gradually reducing the clutch torque within a range which is lower than the current level and is equal to or greater than a second reference torque level which is lower than the first reference torque level; [D] when the wheel slip ratio is equal to or less than a second reference slip ratio which is less than the first reference slip ratio or when a second reference duration has elapsed after the clutch torque reaches or exceeds the first reference torque level, gradually increasing the clutch torque until the clutch torque reaches a third reference torque level which is higher than the first reference torque level; and [E] stopping the launch control operation when a period during which a clutch slip remains less than a predetermined critical synchronous slip is equal to or longer than a predetermined critical duration, in which after step [D], when the clutch slip is equal to or less than a first reference clutch slip, an average speed of driven wheels is equal to or greater than a first reference speed, and the wheel slip ratio is equal to or less than a third reference slip ratio, a step of increasing the clutch torque toward a fourth reference torque level is performed.

When the average speed of the driven wheels is equal to or greater than a second reference speed or when the period during which the clutch slip remains less than the predetermined critical synchronous slip is equal to or lower than the critical synchronization duration, the launch control operation may be brought into a stop.

In the method, activation of a wheel spin prevention control function for the driving wheels may be prohibited while each of the steps is performed.

The present invention enables an accurate and precise control on vehicle launch, providing an extremely fast acceleration at the time of vehicle launch. This improves the driving performance of a vehicle and makes a driver experience dramatically improved driving comfort, resulting in improved customer satisfaction for the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions of embodiments of the present invention disclosed in the specification of the present invention are provided only for illustrative purposes. The present invention may be embodied in various forms and it should not be construed that embodiments of the present invention are limited only to the exemplary embodiments described in the specification of the present application.

There may be various embodiments in accordance with the concept of the present invention, and only various exemplary embodiments will be illustrated in the drawings and described in detail in the description below. While specific embodiments of the present invention are described herein below, they are only for illustrative purposes and should not be construed as limiting to the present invention. Thus, the present invention should be construed to cover not only the specific embodiments but also cover all modifications, equivalents, and substitutions that fall within the concept and technical spirit of the present invention.

Terms used in the specification, "first", "second", etc. can be configured to discriminate one element from another element, but the order or priority of the elements are not limited by the terms unless specifically stated. Accordingly, a first element in various exemplary embodiments of the present invention may be referred to as a second element in another exemplary embodiment of the present invention, and similarly, a second element in various exemplary embodiments of the present invention may be referred to as a first element in another exemplary embodiment of the present invention, only for discrimination of one element from another element, without departing from the scope of the present invention as claimed.

It will be understood that when any element is referred to as being "connected" or "coupled" to another element, one element may be directly connected or coupled to the other element, or an intervening element may be present therebetween. In contrast, it should be understood that when an element is referred to as being "directly coupled" or "directly connected" to another element, there are no intervening elements present between them. Other expressions describing relationships between elements, for example, "between", "directly between", "adjacent to", "directly adjacent" should be interpreted in the same manner.

The terminology used herein is for the purpose of describing various exemplary embodiments only and is not intended to be limiting. As used herein, the singular forms "a", "an", and "the" are intended to include the plural forms as well unless the context clearly indicates otherwise. It will be further understood that the terms "comprises", "includes", or "has" when used in various exemplary embodiments of the present invention specify the presence of stated features, regions, integers, steps, operations, elements and/or components, but do not preclude the presence or addition of one or more other features, regions, integers, steps, operations, elements, components and/or combinations thereof.

In addition, unless otherwise defined, all terms including technical and scientific terms used herein have the same meaning as commonly understood by those who are ordinarily skilled in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Hereinafter, exemplary embodiments of the present invention will be described in detail with reference to the accompanying drawings. Through the drawings, like reference symbols denote like elements.

Figure 1:
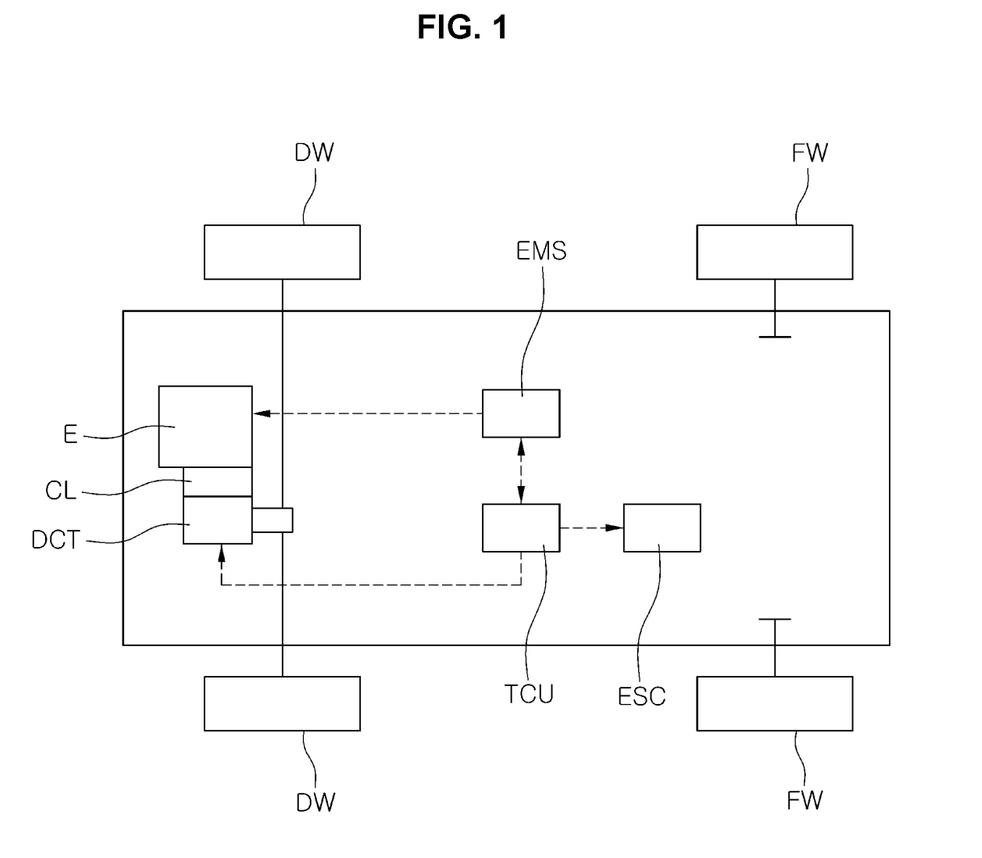
FIG. 1 is a block diagram illustrating the construction of a DCT-provided vehicle to which various exemplary embodiments of the present invention is applicable.

FIG. 1 is a block diagram illustrating the construction of a DCT-provided vehicle to which various exemplary embodiments of the present invention is applicable. Referring to FIG. 1, the vehicle is constructed such that the output power of an engine E undergoes an upshift or a downshift through a dual clutch transmission (DCT) and the resulting output power is delivered to driving wheels DW.

In various exemplary embodiments of the present invention, it is assumed that the front wheels are driving wheels and the rear wheels are driven wheels.

The DCT receives the output power of the engine through two clutches. However, in describing the present invention below, the term "clutch" refers to a clutch associated with the lowest forward drive level of a vehicle in terms that thee present invention relates to a control method for vehicle launch.

It is noted that in FIG. 1, the clutch is denoted by "CL". It is further noted that in FIG. 4, an "engagement-side clutch" in a dual clutch transmission is a clutch used for driving the vehicle at the lowest forward drive level and means a clutch which is engaged during the launch control operation according to various exemplary embodiments of the present invention, and a "release-side clutch" is the other clutch in the dual clutch transmission.

The engine E is controlled by an engine management system (EMS), the DCT is controlled by a transmission control unit (TCU), and the EMS and the TCU communicates with each other to exchange information between them.

A controller area network (CAN) may be used for the communication. The TCU communicates with an electronic stability control system (ESC) and a traction control system (TCS) that are systems to perform a wheel spin prevention function for driving wheels of a vehicle.

Figure 2:
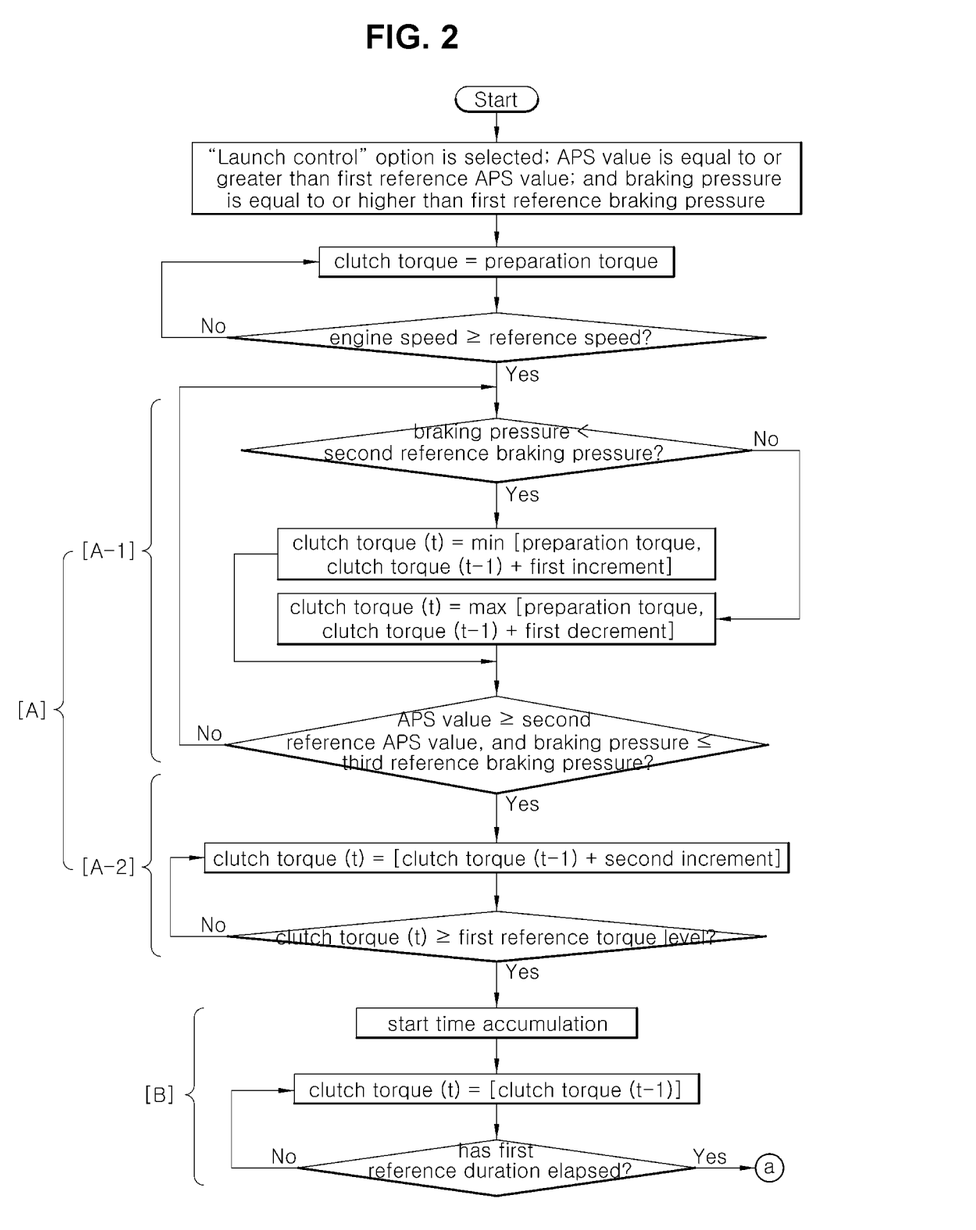
FIG. 2 and FIG. 3 are flowcharts illustrating a control flow during a vehicle launch control operation according to various exemplary embodiments of the present invention.
Figure 3:
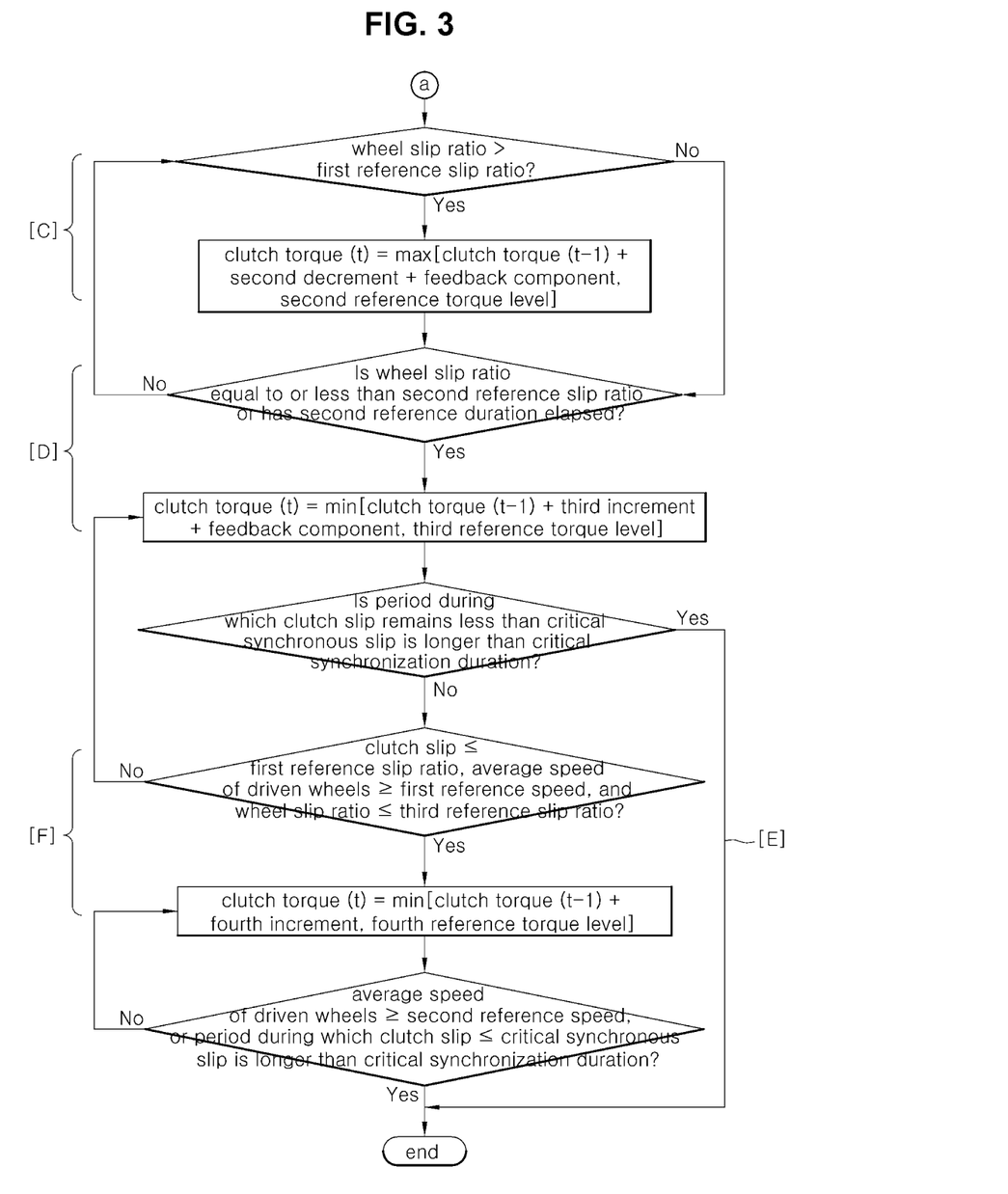

FIG. 2 and FIG. 3 are flowcharts illustrating a control flow of a vehicle launch control method according to various exemplary embodiments of the present invention. The method includes a plurality of steps respectively denoted by [A], [B], [C], [D], and [E]. In step [A], when a launch control operation is initiated, clutch torque is adaptively increased according to a decrease in braking pressure. In step [B], when the clutch torque reaches or exceeds a first reference torque level, a current level of the clutch torque is maintained for a first reference duration. In step [C], after the lapse of the first reference duration, when a wheel slip ratio exceeds a first reference slip ratio, the clutch torque is gradually reduced in a range which is lower than the current level and is equal to or greater than a second reference torque level which is lower than the first reference torque level. In step [D], when the wheel slip ratio is equal to or less than a second reference slip ratio which is less than the first reference slip ratio, or when a second reference duration has elapsed from a time instant at which the clutch torque reaches or exceeds the first reference torque level, the clutch torque is gradually increased from the current level until a third reference torque level which is higher than the first reference torque level is reached. In step [E], the launch control operation is brought to a stop when a period during which a clutch slip remains less than a predetermined critical synchronous slip is equal to or longer than a predetermined critical synchronization duration.

That is, in the exemplary embodiment of the present invention, when the launch control is activated, the braking pressure is reduced and the clutch torque is gradually increased according to a decrease in the braking pressure to deliver the driving force to the driving wheels from the engine. Accordingly, the clutch torque is maintained at the current torque level for the first reference duration. When the present results in an excessive increase in the wheel slip ratio, the clutch torque is slightly reduced from the current torque level to limit the wheel slip ratio. On the other hand, when this results in a sufficient decrease in the wheel slip ratio or when the second reference duration has elapse, the clutch torque is increased to deliver a sufficient driving force to the driving wheels. Therefore, it is possible to transfer a large driving force to the driving wheels while suppressing an increase in the wheel slip ratio.

The launch control operation is initiated, when a driver selects a launch control option and depresses both an accelerator pedal and a brake pedal and an engine speed reaches a predetermined reference speed.

In other words, the launch control operation is started when all of the conditions are satisfied: an APS value increases to reach or exceed a first reference APS value by depressing the accelerator pedal; the braking pressure increases to reach or exceed a first reference braking pressure by depressing the brake pedal; and the engine speed increases to reach or exceed the reference engine speed, in a state in which the vehicle is at a standstill and in which the driver makes an input operation to activate the launch control function with an audio/video/navigation (AVN) system or a dedicated operation switch.

Figure 4:
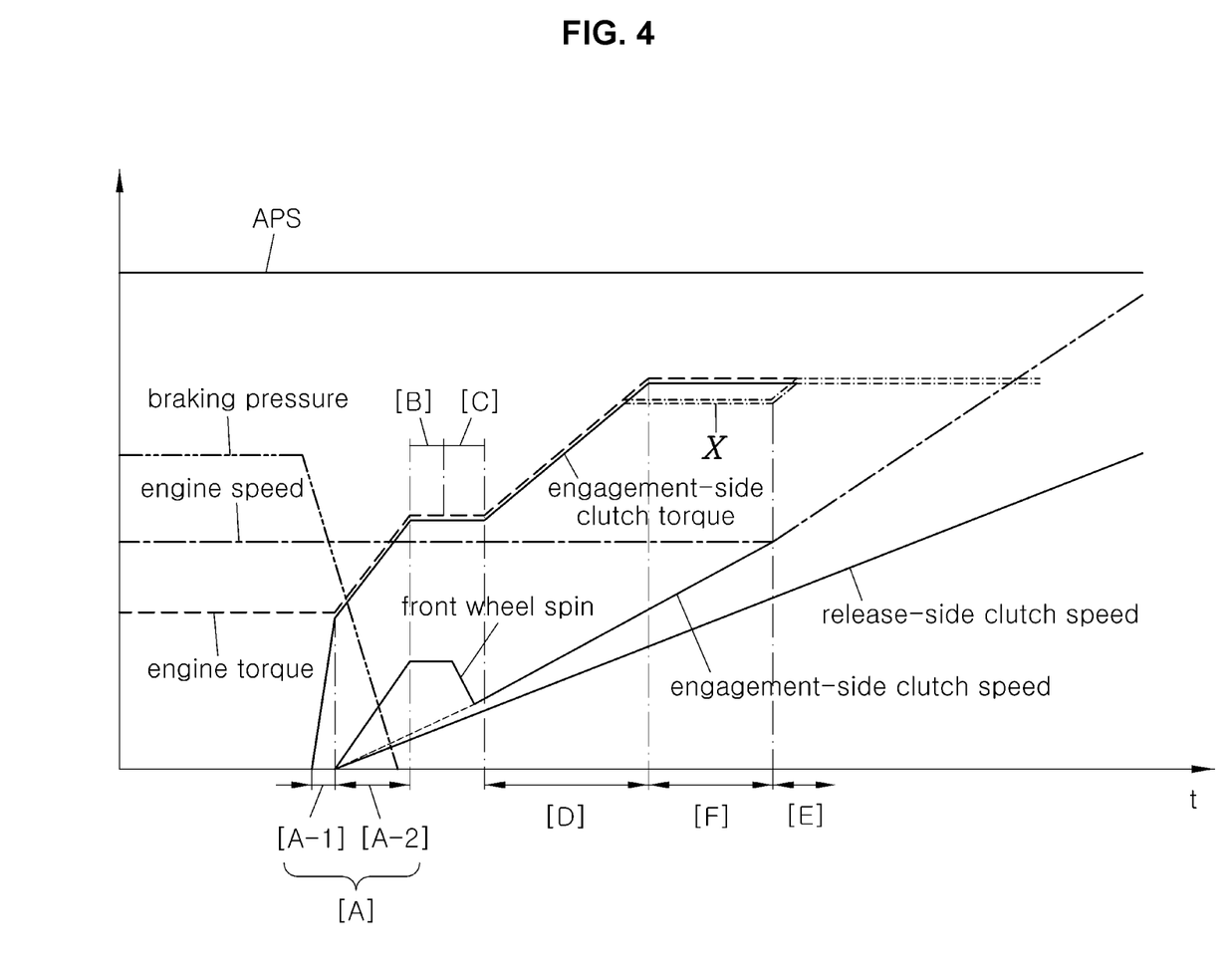
FIG. 4 is a graph illustrating changes in various parameters during the vehicle launch control operation according to various exemplary embodiments of the present invention.

FIG. 4 shows a state in which the launch control operation is initiated and the engine speed is increased to the reference speed.

Here, the reference speed may be a setpoint which is determined, with the use of the AVN system or the like, by the driver. The setpoint is normally within a range of 2000 RPM to 3000 RPM.

In FIG. 2, the operation amount of the accelerator pedal is read out as an APS value in which APS stands for an accelerator pedal sensor or an accelerator position sensor. That is, the APS value is a signal output from the accelerator pedal (or position) sensor.

Each of the first reference APS value and the first reference braking pressure is set to a value provided as a criterion to determine whether or not the driver actually wants to activate the launch control function. The setpoints for the first reference APS value and the first reference braking pressure are values corresponding to over 80% of the maximum APS value and the maximum braking pressure, respectively.

The clutch torque may be maintained at a predetermined preparation torque level until the engine speed reaches the reference engine speed.

When increasing the clutch torque is started before the engine speed sufficiently increases, the vehicle enters an unstable state situation such as an engine start-off state. When a clutch engagement is started in a state where the clutch is completely released, clutch torque control response deteriorates.

Therefore, when the engine torque starts increasing due to the driver's accelerator pedal operation, the clutch is controlled to enter a prepared state which comes immediately before an instant at which the clutch starts a torque transmission, and the prepared state is maintained preferably until the engine speed reaches the reference speed.

Hereinafter, the clutch torque level maintained during the prepared state is referred to as a "preparation torque level".

The prepared state which comes immediately before an instant at which the clutch starts a torque transmission, is also a touch point state in which the clutch begins to generate a frictional force. Therefore, the preparation torque level is a level which is substantially close to "ON".

In step [A], when the braking pressure is equal to or greater than a second reference braking pressure, the clutch torque is gradually reduced. On the other hand, when the braking pressure is lower than the second reference braking pressure, the clutch torque is linearly increased at a rate corresponding to a first gradient [step A-1].

That is, since the braking pressure is reduced usually by releasing the brake pedal, the clutch torque is gradually increased so that the driving force (i.e., increased torque) may be transmitted to the driving wheels.

In the case where the braking pressure is first reduced to below the second reference braking pressure and is then increased to above the second reference braking pressure, it is determined that the driver changes his mind and wants to have the vehicle being stationary. In the instant case, the clutch torque is reduced to suppress the heat generation of the clutch and is prepared for the stationary state of the vehicle.

Accordingly, in view of the purpose described above, the second reference braking pressure is preferably set to a value corresponding to 70% of the maximum braking pressure.

In FIG. 2, a first increment which is the amount of an increase in the clutch torque has the largest value among the changes of the control parameters so that the first gradient of the graph in FIG. 4 is maximally increased.

That is, when the clutch torque is increased at a high rate from the preparation torque level, an improved launch control response may be obtained.

On the other hand, a first decrement is set to a value which is as large as the first increment. That is, when the driver re-depresses the brake pedal after releasing the brake pedal, the clutch torque is rapidly reduced for protection of the clutch.

In step [A-1], in the case where the driver completely releases the brake pedal to proceed to perform the launch control, when the accelerator pedal is depressed down to below a position corresponding to a second reference APS value and the braking pressure is reduced to below a third reference braking pressure which is lower than the second reference braking pressure during the depression operation of the accelerator pedal, the clutch torque is linearly increased up to the first reference torque level at a rate corresponding to a second gradient [A-2].

That is, when the driver really wants to perform the normal launch control operation, the driver will continue to fully depress the accelerator pedal and almost completely release the brake pedal. After confirming the driver's intension on the basis of the second reference APS value and the third reference braking pressure, the clutch torque is increased to deliver a substantially required driving force to the driving wheels so that the vehicle launch may be performed.

Accordingly, the second reference APS value is set to be close or identical to the first reference APS value. For example, the second reference APS value corresponds to 90% of the maximum APS value, and the third reference braking pressure corresponds to 25% of the maximum braking pressure.

Furthermore, a second increment that allows the clutch torque to be increased up to the first reference torque at a rate corresponding to a second gradient is suitably set according to the type of the vehicle through a number of experiments and analysis. That is, the second increment is set to be in a range that prevents a large increase in the wheel slip and allows a fast increase in the driving force for the driving wheels when the clutch torque reaches the first reference torque level.

The first reference torque level is adaptively determined depending on a reference engine speed which is set by the driver with the use of the AVN or the like. For example, when the reference engine speed is 2000 RPM, the first reference torque level is set to 100 N. On the other hand, when the reference engine speed is 3000 RPM, the first reference torque level is set to 150 N.

When the clutch torque reaches the first reference torque level at a certain time instant, the reached torque level is maintained for the first reference duration in step [B].

The first reference duration is set to about 150 ms which allows an operation of checking whether or not there is a wheel slip between the driving wheels within a brief period during which an operation of increasing the clutch torque is temporarily stopped.

In step [C], after the lapse of the first reference duration, when a wheel slip ratio exceeds a first reference slip ratio, the clutch torque is gradually reduced in a range which is lower than the first reference torque level and is equal to or greater than a second reference torque level which is lower than the first reference torque level.

That is, when there is a wheel slip between the driving wheels and the wheel slip ratio is increased to exceed the first reference slip ratio, the clutch torque is gradually reduced from the first reference torque level to suppress the increase in the wheel slip. However, in the case where the clutch torque is excessively reduced, a sufficient driving force for driving the driving wheels cannot be obtained. Therefore, the clutch torque is not reduced to be lower than the second reference torque level.

The determination about whether there is a wheel slip between the driving wheels is made on the basis of the wheel slip ratio. The wheel slip ratio may be determined by Equation 1 when the driving wheels are the front wheels and the driven wheels are the rear wheels.

wheel slip ratio=(average speed of front wheels−average speed of rear wheels)/average speed of rear wheels [Equation 1]

Here, the average speed of the rear wheels is assumed to be 3 kph or more.

Therefore, the first reference slip ratio is set to a value in a range that allows the driver to identify a state in which the wheel slip of the driving wheel is too large to deliver a sufficient driving force to the road surface, and the second reference torque level is set to a value in a range that suppresses an increase in the wheel slip and allows a transmission of a sufficient vehicle driving force. Preferably, both of the first reference slip ratio and the second reference torque level are suitably determined through a number of experiments and analysis.

Furthermore, a second decrement for the clutch torque is set to a size by which the clutch torque may be gradually reduced from the first clutch torque level to the second clutch torque level to achieve the purpose described above. Thus, with the setpoint for the second decrement for the clutch torque, a wheel slip is reduced and a sudden drop in the driving force is prevented.

In step [C], the clutch torque is reduced while a feedback control operation to reduce the wheel slip ratio is performed.

That is, the feedback of the wheel slip ratio is performed to determine a proportional control component and an integral control component, and a new torque level to be reached is determined on the basis of the feedback components including the determined components, the immediately previous level of the clutch torque, and the second decrement.

In the exemplary embodiment illustrated in FIG. 2, the representation shows that the second decrement and the feedback component are added to the immediately previous level of the clutch torque. However, since the second decrement has a negative value, and the feedback component has a positive or negative value, the target level of the clutch torque, which is obtained through the determination, is lower than the immediately previous level of the clutch torque. In the present way, the clutch torque gradually converges to the second reference torque level.

The new target level of the clutch torque, which is to be reached, is denoted by "clutch torque (t)", and the immediately previous level of the clutch torque is denoted by "clutch torque (t−1)".

When the wheel slip ratio is reduced, through step [C], to be equal to or less than the second reference slip ratio which is less than the first reference slip ratio or when the second reference duration has elapsed after the clutch torque reaches or exceeds the first reference torque level, the clutch torque is gradually increased until the clutch torque reaches a third reference torque level which is higher than the first reference torque level. This step is denoted by [D].

That is, when the wheel slip ratio is reduced to be equal to or less than the second reference slip ratio, the clutch torque is increased again to maximize the driving force of the vehicle.

Even though the wheel slip ratio is reduced but is still greater than the second reference slip ratio, the clutch torque is reinstated to increase the driving force of the vehicle after the lapse of the second reference duration, achieving the purpose of the launch control.

To achieve the purpose described above, the second reference slip ratio is set to satisfy a condition in which even though the second reference duration has not elapsed, the clutch torque is reinstated to maximize the driving force of the vehicle, obtaining a stronger vehicle acceleration. Furthermore, it is desirable to set the second reference duration on the basis of an idea that it is necessary to reinstate the clutch torque at a certain time instant to achieve the purpose of the launch control although the wheel slip ratio is not sufficiently reduced.

For example, the second reference duration may be set to 600 ms.

The third reference torque level may be set to be the same as the maximum output torque of the engine.

In step [C], the clutch torque is not reduced but is maintained as it is when the wheel slip ratio is equal to or less than the first reference slip ratio.

That is, when there is no wheel slip or when only an insignificant wheel slip occurs, the clutch torque is maintained at the first reference torque level so that a large driving force may be obtained.

In the instant case, when the second reference duration has elapsed, step [D] is performed.

In step [D], the clutch torque is increased while a feedback control operation to reduce the wheel slip ratio is performed.

That is, when the clutch torque is increased, the clutch torque is not increased at a constant rate but is increased at a variable rate to limit the wheel slip by taking into account the feedback control components depending on the wheel slip.

Accordingly, in step [D], the feedback of the wheel slip ratio is performed to derive a proportional control component and an integral control component, and a new clutch torque level to be reached is determined on the basis of the feedback components including the derived components, the immediately previous level of the clutch torque, and the third increment.

The third increment for the clutch torque is preferably set to a value on the basis of which the clutch torque may be rapidly increased from the first reference torque level to the maximum engine torque while suppressing the wheel slip.

In step [D], when the state in which the clutch slip is less than the predetermined critical synchronous slip lasts for a predetermined critical synchronization duration or longer than the predetermined critical synchronization duration, step [E] in which the control operation ends is performed.

The clutch slip is a difference between the engine speed and the clutch speed, and the predetermined critical synchronous slip is a critical speed difference representing a state in which the engine speed and the clutch speed are almost identical so that an engine operation is almost synchronized with a clutch operation. For example, the predetermined critical synchronous slip is set to 20 RPM and the critical synchronization duration is set to 50 ms. In the instant case, the state in which the clutch slip is less than the predetermined critical synchronous slip is stably maintained.

That is, the case in which the clutch slip remains less than the predetermined critical synchronous slip for the critical synchronization duration or longer means a state in which the clutch operation and the engine operation are almost synchronized. In the instant case, the launch control comes to an end.

In various exemplary embodiments of the present invention, in a case where the condition defined in step [E] is not satisfied after execution of step [D], when the clutch slip is equal to or less than a first reference clutch slip, the average speed of the driven wheels is equal to or greater than a first reference speed, and the wheel slip ratio is equal to or less than a third reference slip ratio, a step [F] is performed. That is, the clutch torque is increased toward a fourth reference torque level such that the clutch speed is matched with the engine speed.

The first reference clutch slip is set to, for example, 100 rpm which is a longer time than the predetermined critical synchronous slip. The first reference clutch slip serves as a criterion to identify the state in which the clutch speed is not yet matched with the engine speed. The first reference vehicle speed is set to a speed on the basis of which it is possible to identify a state in which acceleration of the vehicle is normally started through the launch control. The third reference slip ratio is set to a value that ensures a state in which the wheel slip between the driving wheels is not excessively increased although the clutch torque is further increased.

When the above conditions are satisfied, the clutch torque is gradually increased toward the fourth reference torque level on the basis of a fourth increment so that the clutch speed is matched with the engine speed.

Therefore, the fourth reference torque level is slightly higher than the third reference torque level and is a level that allows a perfect clutch engagement which makes the clutch speed identical to the engine speed. The fourth increment may set to a value that allows fast matching between the clutch speed and the engine speed, suppresses a wheel slip, and prevents occurrence of the wheel slip. The value of the fourth increment is suitably determined through a number of experiments and analysis.

When the average speed of the driven wheels is equal to or greater than a second reference speed or when a period during which the clutch slip remains less than the predetermined critical synchronous slip is equal to or longer than the critical synchronization duration, the launch control comes to an end.

Here, the second reference speed is set to be higher than the first reference speed and is set to a speed ensuring a state in which the vehicle acceleration is almost completely performed through the launch control.

For reference, X in FIG. 4 represents a case where the launch control operation according to various exemplary embodiments of the present invention ends because the conditions defined in the steps [E] and [F] are satisfied through the execution of step [D] before the clutch torque reaches the third reference torque level.

During each step of the launch control operation of the present invention, it is desirable to prohibit activation of a driving wheel spin prevention function to avoid operation conflicts with other control devices such as ECS, TCS, and the like.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle launch control method comprising the steps of:
   increasing clutch torque of a clutch according to a decrease in braking pressure when a launch control operation is initiated;
   maintaining the clutch torque at a current torque level for a first reference duration when the clutch torque reaches or exceeds a first reference torque level;
   after a lapse of the first reference duration, when a wheel slip ratio exceeds a first reference slip ratio, reducing the clutch torque in a range which is lower than the first reference torque level and is equal to or greater than a second reference torque level which is lower than the first reference torque level;
   when the wheel slip ratio is equal to or less than a second reference slip ratio which is less than the first reference slip ratio or when a second reference duration elapses after the clutch torque reaches or exceeds the first reference torque level, increasing the clutch torque until the clutch torque reaches a third reference torque level which is higher than the first reference torque level; and
   stopping the launch control operation when a state in which a clutch slip remains less than a predetermined critical synchronous slip is maintained for a predetermined critical synchronization duration or longer than the predetermined critical synchronization duration.

2. The method according to claim 1, wherein the launch control operation is initiated when a driver makes an input to select a launch control option and depresses an accelerator pedal and a brake pedal until an engine speed increases and reaches a reference engine speed.

3. The method according to claim 2, wherein the clutch torque is maintained at a preparation torque level until the engine speed reaches the reference engine speed.

4. The method according to claim 1, wherein in the increasing clutch torque of the clutch according to the decrease in the braking pressure, the clutch torque is reduced when the braking pressure is equal to or greater than a first reference braking pressure, and the clutch torque is increased at a rate corresponding to a first gradient when the braking pressure is lower than the first reference braking pressure.

5. The method according to claim 4, wherein when an accelerator pedal remains depressed down to below a position that corresponds to a predetermined reference accelerator pedal sensor (APS) value, and the braking pressure becomes equal to or lower than a second reference braking pressure which is lower than the first reference braking pressure, the clutch torque is increased at a rate corresponding to a second gradient until the clutch torque reaches the first reference torque level.

6. The method according to claim 1, wherein in the reducing the clutch torque in the range which is lower than the first reference torque level and is equal to or greater than the second reference torque level, the clutch torque is reduced while a feedback control to reduce the wheel slip ratio is performed.

7. The method according to claim 1, wherein in the reducing the clutch torque in the range which is lower than the first reference torque level and is equal to or greater than the second reference torque level, when the wheel slip ratio is less than the first reference slip ratio, the clutch torque is not reduced but is maintained.

8. The method according to claim 1, wherein in the increasing the clutch torque until the clutch torque reaches the third reference torque level, the clutch torque is reduced while a feedback control to reduce the wheel slip ratio is performed.

9. A vehicle launch control method comprising:
(i) increasing clutch torque of a clutch of a vehicle according to a decrease in braking pressure when a launch control operation is initiated;
(ii) maintaining the clutch torque at a current torque level for a first reference duration when the clutch torque reaches or exceeds a first reference torque level;
(iii) after a lapse of the first reference duration, when a wheel slip ratio exceeds a first reference slip ratio, reducing the clutch torque within a range which is lower than the first reference torque level and is equal to or greater than a second reference torque level which is lower than the first reference torque level;
(iv) when the wheel slip ratio is equal to or less than a second reference slip ratio which is less than the first reference slip ratio or when a second reference duration elapses after the clutch torque reaches or exceeds the first reference torque level, increasing the clutch torque until the clutch torque reaches a third reference torque level which is higher than the first reference torque level; and
(v) stopping the launch control operation when a state in which a clutch slip remains less than a predetermined critical synchronous slip is maintained for a predetermined critical synchronization duration or longer than the predetermined critical synchronization duration,
wherein after the step (iv), when the clutch slip is equal to or less than a first reference clutch slip, an average speed of driven wheels of the vehicle is equal to or greater than a first reference speed, and the wheel slip ratio is equal to or less than a third reference wheel slip ratio, a step of increasing the clutch torque toward a fourth reference torque level is performed.

10. The method according to claim 9, wherein when the average speed of the driven wheels is equal to or greater than a second reference speed or when the clutch slip remains lower than the predetermined critical synchronous slip for the predetermined critical synchronization duration or longer than the predetermined critical synchronization duration, the launch control operation is brought into a stop.

11. The method according to claim 9, wherein during each of the (i), (ii), (iii), (iv) and (v) steps, activation of a driving wheel spin prevention control function is prohibited.

12. A vehicle comprising:
a transmission;
an engine, wherein an output power of the engine undergoes an upshift or a downshift through the transmission;
a clutch mounted between the engine and the transmission; and
a controller electrically connected to the transmission and the clutch,
wherein the controller is configured for:
increasing clutch torque of the clutch according to a decrease in braking pressure when a launch control operation of the vehicle is initiated;
maintaining the clutch torque at a current torque level for a first reference duration when the controller determines that the clutch torque reaches or exceeds a first reference torque level;
after a lapse of the first reference duration, when a wheel slip ratio exceeds a first reference slip ratio, reducing the clutch torque in a range which is lower than the first reference torque level and is equal to or greater than a second reference torque level which is lower than the first reference torque level;
when the wheel slip ratio is equal to or less than a second reference slip ratio which is less than the first reference slip ratio or when a second reference duration elapses after the clutch torque reaches or exceeds the first reference torque level, increasing the clutch torque until the clutch torque reaches a third reference torque level which is higher than the first reference torque level; and
stopping the launch control operation when the controller determines that a state in which a clutch slip remains less than a predetermined critical synchronous slip is maintained for a predetermined critical synchronization duration or longer than the predetermined critical synchronization duration.

13. The vehicle according to claim 12, wherein the controller is configured to initiate the launch control operation when the controller determines that a driver makes an input to select a launch control option and depresses an accelerator pedal and a brake pedal of the vehicle until an engine speed of the engine increases and reaches a reference engine speed.

14. The vehicle according to claim 13, wherein the controller is configured for maintaining the clutch torque at a preparation torque level until the engine speed reaches the reference engine speed.

15. The vehicle according to claim 12, wherein in the increasing clutch torque according to the decrease in the braking pressure, the controller is configured for reducing the clutch torque when the controller determines that the braking pressure is equal to or greater than a first reference braking pressure, and for increasing the clutch torque at a rate corresponding to a first gradient when the controller determines that the braking pressure is lower than the first reference braking pressure.

16. The vehicle according to claim 15, wherein when an accelerator pedal remains depressed down to below a position that corresponds to a predetermined reference accelerator pedal sensor (APS) value, and the braking pressure becomes equal to or lower than a second reference braking pressure which is lower than the first reference braking pressure, the controller is configured for increasing the clutch torque at a rate corresponding to a second gradient until the clutch torque reaches the first reference torque level.

17. The vehicle according to claim 12, wherein in the reducing the clutch torque in the range which is lower than the first reference torque level and is equal to or greater than the second reference torque level, the controller is configured for reducing the clutch torque while a feedback control to reduce the wheel slip ratio is performed.

18. The vehicle according to claim 12, wherein in the reducing the clutch torque in the range which is lower than the first reference torque level and is equal to or greater than the second reference torque level, when the wheel slip ratio is less than the first reference slip ratio, the controller is configured for maintaining the clutch torque.

19. The vehicle according to claim 12, wherein in the increasing the clutch torque until the clutch torque reaches the third reference torque level, the controller is configured for reducing the clutch torque while a feedback control to reduce the wheel slip ratio is performed.

20. The vehicle according to claim 12,
wherein after increasing the clutch torque until the clutch torque reaches the third reference torque level which is higher than the first reference torque level, when the clutch slip is equal to or less than a first reference clutch slip, an average speed of driven wheels of the vehicle is equal to or greater than a first reference speed, and the wheel slip ratio is equal to or less than a third reference wheel slip ratio, the controller is configured for increasing the clutch torque toward a fourth reference torque level.

* * * * *